(12) United States Patent
Burrows

(10) Patent No.: US 9,644,349 B2
(45) Date of Patent: May 9, 2017

(54) CONTROLLER AND CONTROL SYSTEM FOR A PRESSURE REDUCING VALVE

(75) Inventor: Andrew Roland Burrows, Soberton (GB)

(73) Assignee: i2O Water Limited, Southhampton (GB)

( * ) Notice: Subject to any disclaimer, the term of this patent is extended or adjusted under 35 U.S.C. 154(b) by 1205 days.

(21) Appl. No.: 12/524,534

(22) PCT Filed: Jan. 24, 2008

(86) PCT No.: PCT/GB2008/000265
§ 371 (c)(1),
(2), (4) Date: Feb. 2, 2010

(87) PCT Pub. No.: WO2008/090359
PCT Pub. Date: Jul. 31, 2008

(65) Prior Publication Data
US 2010/0168927 A1    Jul. 1, 2010

(30) Foreign Application Priority Data

Jan. 24, 2007 (GB) .................................. 0701352.7
Mar. 22, 2007 (GB) .................................. 0705538.7
Nov. 14, 2007 (GB) .................................. 0722343.1

(51) Int. Cl.
*G05D 16/20* (2006.01)
*G05D 7/06* (2006.01)
(Continued)

(52) U.S. Cl.
CPC ............... *E03B 1/00* (2013.01); *E03B 7/075* (2013.01); *G05D 16/163* (2013.01); *G05D 16/2093* (2013.01)

(58) Field of Classification Search
CPC .................................. G05D 16/20; G05D 7/06
(Continued)

(56) References Cited

U.S. PATENT DOCUMENTS

| 4,200,911 A | 4/1980 | Matsumoto |
| 5,427,350 A | 6/1995 | Rinkewich |

(Continued)

FOREIGN PATENT DOCUMENTS

| EP | 0 574 241 | 12/1993 |
| FR | 2915755 | 11/2008 |

(Continued)

OTHER PUBLICATIONS

Fantozzi et al., "Experience and results achieved in introducing District Metering Areas (DMA) and Pressure Management Areas (PMA) at Enia utility (Italy)," downloaed from www.miya-water.com, 2009, 8 pages.

(Continued)

*Primary Examiner* — Tejal Gami
(74) *Attorney, Agent, or Firm* — McDonnell Boehnen Hulbert & Berghoff LLP.

(57) ABSTRACT

A controller (8) for a pilot valve (102) which adjusts the output pressure of a pressure reducing valve (44) supplying water to a consumer region (3). With the aim of reducing output pressure whilst still providing a minimum required pressure at a critical point (CP) in the region, the controller adjusts the output pressure in accordance with the flow rate. The controller includes a clock (22) and the relationship between the required output pressure and the measured flow rate is time dependent. Parameters which define the relationship are supplied to the controller (8) from a remote data processing system (13) which analyses flow rate and output pressure data transmitted from the controller, and also pressure data from a remote sensor (10) at the critical point. At intervals, the controller (8) establishes a wireless connection with the remote system (13), to transmit logged data, and to receive parameters covering a period of time which is greater than the interval between communication sessions.

18 Claims, 5 Drawing Sheets

(51) Int. Cl.
*E03B 1/00* (2006.01)
*E03B 7/07* (2006.01)
*G05D 16/16* (2006.01)

(58) Field of Classification Search
USPC ............ 700/282, 28; 417/20; 137/488, 12
See application file for complete search history.

(56) References Cited

U.S. PATENT DOCUMENTS

| | | | |
|---|---|---|---|
| 5,460,196 A * | 10/1995 | Yonnet | 137/12 |
| 6,017,193 A | 1/2000 | Takeuchi | |
| 6,245,224 B1 | 6/2001 | Enoki et al. | |
| 6,371,156 B1 | 4/2002 | Walton et al. | |
| 7,201,180 B2 | 4/2007 | Ephrat et al. | |
| 2004/0020862 A1 | 2/2004 | Baca et al. | |
| 2005/0016593 A1* | 1/2005 | Ephrat et al. | 137/488 |
| 2005/0199483 A1 | 9/2005 | Kroll | |
| 2006/0020427 A1 | 1/2006 | Kahn et al. | |
| 2007/0090059 A1 | 4/2007 | Plummer et al. | |
| 2010/0141459 A1 | 6/2010 | Pham et al. | |
| 2010/0156632 A1 | 6/2010 | Hyland et al. | |

FOREIGN PATENT DOCUMENTS

| | | |
|---|---|---|
| GB | 2 123 983 | 2/1984 |
| GB | 2405957 | 3/2005 |
| JP | 6303677 | 10/1994 |
| JP | 2001 280597 | 10/2001 |
| WO | 99/23544 | 5/1999 |
| WO | WO 03/057998 | 7/2003 |
| WO | 2005/022145 | 3/2005 |
| WO | 2008/090359 | 7/2008 |
| WO | 2008/114036 | 9/2008 |

OTHER PUBLICATIONS

PCT International Search Report and Written Opinion, PCT International Application No. PCT/GB2009/002963, mailed Jul. 26, 2010, 24 pages.

Sekhonyana et al., "Maximizing the benefits from water and environmental sanitation, Improving Utility Management: Case Study from Lesotho," 31st WEDC International Conference, Kampala, Uganda, 2005, pp. 254-257.

* cited by examiner

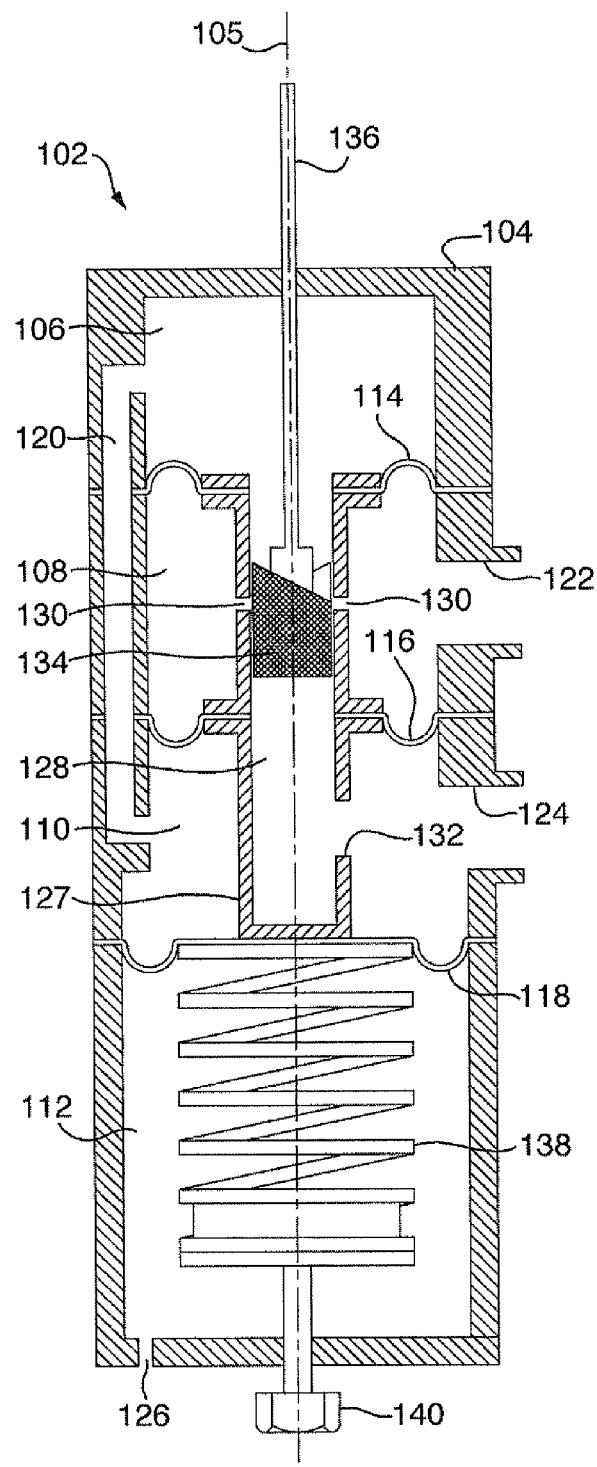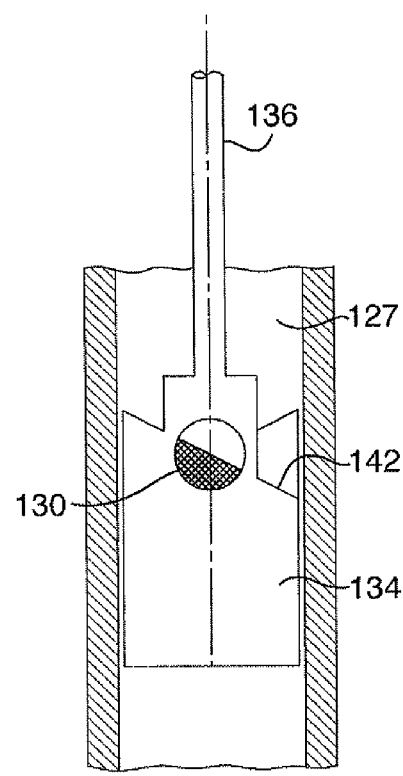
Figure 4
Figure 5

CONTROLLER AND CONTROL SYSTEM FOR A PRESSURE REDUCING VALVE

This invention relates to a controller and a control system for adjusting the output pressure of a pressure reducing valve supplying water to a consumer region. The invention is particularly, but not exclusively concerned with controlling a pilot valve which alters the pressure of the pressure reducing valve.

In preferred embodiments, the invention is concerned with the control of the pressure of water supplied to a consumer region from a high pressure mains supply, and more particularly with the supply of water to a district metering area (DMA). However, the invention is also applicable to the supply of water in other circumstances, such as in a large industrial complex.

The pressure in a mains water distribution system is created by pumps and/or the gravity head of water in a reservoir, water tower or the like. The pressure in the main arterial supply conduits is significantly higher than that required by consumers, whether domestic, agricultural or industrial. In a typical distribution system, a number of consumers are arranged in a region to which water supplied from the main arterial supply network by a pressure reducing valve (PRV). Typically, this region is referred to as a district metering area (DMA).

Historically, the output pressure of the PRV was fixed. Although there are several variations in design of PRV, a globe diaphragm actuated valve is the industry standard in the United Kingdom. Some PRVs are set up to create a fixed reduction in pressure. Others are fitted with pilot valves, which alter the position of the valve such that it automatically gives a fixed outlet pressure regardless of inlet pressure or flow rate. The fixed output pressure must be sufficiently high to ensure adequate pressure throughout the DMA, and in particular at the position which is subjected to the greatest head loss under maximum anticipated flow rates, which may be the highest and/or furthest point from the PRV in the DMA. Generally, the point where the pressure is lowest for a given output pressure from the PRV is known as the critical point and will normally be the highest and/or furthest point away from the PRV. However, it should be appreciated that within a particular DMA there may be more than one critical point, and that the critical point may vary.

A problem with such an arrangement is that at certain times or under certain conditions within the DMA, the fixed pressure may be higher than that necessary to ensure an adequate pressure at the or each Critical Point. It is known that there is a relationship between system pressure and both leakage flow rates and burst rates in a DMA. Thus, if the output pressure can be lower than the fixed pressure whilst still providing adequate pressure at the Critical Point, there will a reduced risk of leakage and burst occurrences.

It has been proposed that the output of the PRV should be variable so that the pressure can be varied depending on demand, thus reducing the average pressure within the DMA and reducing problems with leakages and bursts. Other advantages of controlling the pressure actively include reduced fatigue on the pipe network, the provision of more constant supply pressure to consumers, and a reduction in pressure related consumption.

One system in which a PRV is controlled by a pilot valve is disclosed in GB 2405957. There is a pressure feedback stage including a gate valve that creates a head loss which increases with flow through the PRV. The head loss causes water to flow in a bypass pipe that incorporates a venturi. The pilot valve is controlled by pressure at the venturi. This pressure decreases as flow rate increases, thereby causing the pilot valve to increase the output pressure of the PRV as flow rate increases.

It has also been proposed that a pilot valve should be controlled electrically, using a controller. EP-0574241 discloses a system which varies the PRV output pressure in accordance with a pressure-time profile generated from historical data. This pressure-time modulation system is based on an assumption that demand is cyclically predictable over time. EP-0574241 also refers to an alternative arrangement, in which instead of the output pressure being controlled as a function of time, it is controlled as a function of flow rate. The memory of the controller contains data relating to pressure and flow, and the pressure required is inferred from the measurement of flow. It is stated that with such an arrangement it is not necessary to use the pressure time profile modulation.

Viewed from one aspect, the present invention provides a controller for adjusting the output pressure of a pressure reducing valve supplying water to a consumer region, wherein the controller comprises a flow rate input for receiving a flow rate signal from a flow rate sensor for water flowing into the consumer region through the pressure reducing valve, and means adapted to provide data representative of the flow rate of water flowing into the consumer region through the pressure reducing valve in accordance with the flow rate signal; a control output for providing a signal to adjust the output pressure of the pressure reducing valve; data storage means storing parameters representing a relationship between the flow rate of water and a required output pressure from the pressure reducing valve in order to establish a desired minimum water pressure at a critical point in the consumer region; and processing means configured to process (i) the data representative of the flow rate and (ii) the stored parameters, so that a signal is provided from the control output in order to cause the pressure reducing valve to be adjusted to provide the required output pressure corresponding to the flow rate; characterized in that the parameters represent a relationship between the flow rate of water and the required output pressure from the pressure reducing valve, which is time dependent; the controller comprises a clock providing data representative of time; and the processing means is configured to access the data representative of time, in addition to the stored parameters and the data representative of the flow rate, so that the signal which is provided from the control output causes the pressure reducing valve to be adjusted to provide the required output pressure corresponding to the flow rate and the time.

Thus, this aspect of the invention is characterized by the use of flow rate based modulation of the output pressure, but with time dependency as well. Relying on flow rate means that the system can react to fluctuations in demand which differ from those which would be predicted by analyzing historical data. However, the present invention provides more accurate control of the output pressure because the relationship between flow rate and output pressure is not fixed but varies with time. Consider, for example, a situation where there are two consumers of similar quantities of water, but which make their demands at different times in the day. For example, the first consumer could make its demands during daytime, and the second consumer could make its demands during the night. In either case, the demand and thus the flow rate detected would be similar and a conventional flow based system would adjust the output pressure of the PRV to approximately the same value. However, the consumers could be at widely different geographical locations, with the first consumer close to the PRV and the second consumer much further away. Greater frictional loses are incurred in supplying water to the more distant, second consumer and consequently it is desirable that the output pressure from the PRV, for the same flow rate, is greater when it is the second consumer that is making its demands— which in this hypothetical example would be at night. Using both flow rate and time enables factors such as this to be taken into account.

The time dependency of the relationship between flow rate and the required output pressure can be such as to define the pressure for a given flow rate at a particular time of day, and/or day in the week, and/or time of year. There could be a calendar representing a number of days, and within each day a number of periods. The number of days could correspond to a week, or a number of weeks, or a month, or a number of months, or a year. Within each day, the periods may for example be individual hours, or multiples of hours. In one embodiment, by way of example only, there is a calendar covering every day of the year, and for each day there are eight 3 hour periods, giving a total of 2920 periods in a standard calendar year and 2928 in a leap year. For each period there will be one or more parameters which will define the relationship between the measured flow rate and the required output pressure from the PRV. This could be done by having separate values stored for each period or, for example, by having default values which are used unless there is an entry for a particular period when the relationship needs to vary from the default relationship.

At any particular time, the stored parameters may cover for example an entire year or a shorter time, the arrangement being that as time moves on additional parameters are stored and, optionally, previously used parameters removed. In the preferred arrangement, the parameters are maintained unless replaced by updated values.

When the controller is first commissioned it could be programmed with a basic set of parameters based on experience in previous installations and/or by taking measurements during a trial period. Those parameters can be varied and additional parameters added for further periods of time, by analyzing data from use of the controller in practice. This will require a critical point pressure sensor at the (or each) critical point. The output from this critical point pressure sensor will be processed together with corresponding data relating to the output pressure from the PRV and the flow rate. For synchronization purposes all data will be time stamped (which includes time/date stamping, using times codes and so forth). The data from the critical point pressure sensor could be logged at the critical point and then collected or transmitted for analysis.

The calculation of the parameters could be carried out within the controller using suitable software and/or firmware routines, in which case critical point pressure data would be transmitted to the controller from the critical point or relayed from a central location. However, in the preferred arrangement, the calculation of the parameters is carried out at a remote data processing facility and then the parameters will be transmitted to the controller. This arrangement provides advantages because the processing can be done continuously without draining the battery of the controller where it is battery powered, greater processing power can be employed, and data from other sources can be taken into account readily. For example, the parameters could depend on experience gained from other regions with similar systems whose data can be processed at the central data processing facility. Actual or predicted environmental factors can be taking into account, such as weather forecasts, temperature, rainfall, whether or not there is a hose pipe or sprinkler ban, upcoming sports events or other occasions, television listings, and so forth.

In use of a remote data processing facility, at intervals communication will be established between the controller and the remote data processing system. This could be by means of a wired connection, for example through telephone lines via a dial up or broadband connection, via a dedicated data line and so forth. Preferably, however, the connection is wireless as in many cases the controller will be positioned where there are no communications lines, and indeed no electricity supply which is why battery power will normally be used. Such wireless communication may be by way of a mobile telephone network, for example, or any other suitable wireless network or communications system. Preferably, communication is initiated by the controller at intervals, so that battery power is not wasted keeping a communications module active, waiting for communication from the remote data processing facility.

When communication is established between the controller and the remote data processing system, there will be an exchange of information. The controller will transmit logged data concerning the flow rate and the output pressure, and may also transmit other data such as the input pressure to the PRV, data concerning the flow cross section through the PRV, and other flow and pressure related data which the controller may store. For example, there may be a filter in the system and sensors could measure the pressure drop across the filter so that the remote data facility can determine when the filter requires cleaning or replacement. The flow cross section through the PRV can be determined from detecting the position of a valve closure member, either directly, using a position transducer for example, or by reference to the pressure or volume of water above a diaphragm controlling the position of the valve member. Other data can also be supplied to the remote data processing system by the controller, such as the local temperature if there is suitable equipment connected to the controller, such as rainfall data, humidity, atmospheric pressure and so forth, as might be available from suitable sensors or measuring devices connected to the controller.

The remote data facility will transmit parameters to be stored in the controller, providing the appropriate relationship between flow rate, time, and required output pressure. These may take into account at least some of the data transmitted from the controller during that session of communication, or may be parameters determined previously, the new data provided by the controller being taken into account before parameters are supplied in a subsequent communications session.

Where the controller has one or more environmental sensors, such as a temperature sensor, the relationship between the flow rate and the required output pressure could be not only time dependent but also dependent on the output from the or each environmental sensor.

In general, as regards features of the controller, in preferred embodiments the stored parameters are representative of a relationship between the flow rate of water and the required output pressure from the pressure reducing valve, which varies as a function of the time of day and/or the day of the week and/or the time of the year. Preferably the stored parameters are in respect of discrete intervals covering an entire day, for each of a number of successive days.

Preferably the controller comprises a communications module and is configured to use the communications module at intervals to establish communication with a remote data processing facility and to receive parameters which are stored in the data processing means. Preferably, the communications module is adapted for wireless communication.

Preferably, the controller is provided with an output pressure input for receiving an output pressure signal from an output pressure sensor, and with means adapted to provide data representative of the output pressure from the pressure reducing valve in accordance with the output pressure signal; logging means are provided to log the data representative of the flow rate of water flowing into the consumer region and data representative of the output pressure from the pressure reducing valve, with time stamp data; and the controller is configured to use the communications module at intervals to communicate logged data to the remote data processing facility. Preferably, the controller is further provided with an input pressure input for receiving an input pressure signal from an input pressure sensor, and with means adapted to provide data representative of the input pressure to the pressure reducing valve in accordance with the input pressure signal; and the logged data communicated to the remote data processing facility includes the data representative of the input pressure.

In accordance with another aspect of the invention, there is provided a system comprising a controller having any or all of the features described above, and a remote data processing facility which receives the logged data from the controller and transmits the parameters to the controller at intervals, in which the remote data processing facility further receives critical point pressure data from a pressure sensor adjacent the critical point, the critical point pressure data including time stamp data; and the remote data facility calculates the parameters to be transmitted to the controller using the logged data received from the controller and the critical point pressure data. Preferably, the parameters transmitted to the controller cover a period of time which is greater than the intervals between the controller and the remote data processing facility being in data communication. Preferably, the parameters transmitted to the controller cover a period of at least a week. Preferably, the controller stores parameters covering a period of time and the parameters transmitted from the remote data processing facility are incremental changes to the stored parameters for that period.

It will be appreciated that the use of a controller communicating with a remote data processing system provides advantages even when the parameters governing the relationship between flow rate and required output pressure do not represent a time dependent relationship. Thus, viewed from another aspect of the invention, there is provided a system for adjusting the output pressure of a pressure reducing valve supplying water to a consumer region, comprising a controller and a remote data processing system; characterized in that the controller comprises: a flow rate input for receiving a flow rate signal from a flow rate sensor for water flowing into the consumer region through the pressure reducing valve, and means adapted to provide data representative of the flow rate of water flowing into the consumer region through the pressure reducing valve, in accordance with the flow rate signal; a control output for providing a signal to adjust the output pressure of the pressure reducing valve; data storage means storing parameters representing a relationship between the flow rate of water and a required output pressure from the pressure reducing valve in order to establish a desired minimum water pressure at a critical point in the consumer region; processing means configured to process (i) the data representative of the flow rate and (ii) the stored parameters, so that a signal is provided from the control output in order to cause the pressure reducing valve to be adjusted to provide the required output pressure corresponding to the flow rate; an output pressure input for receiving an output pressure signal from an output pressure sensor, and with means adapted to provide data representative of the output pressure from the pressure reducing valve in accordance with the output pressure signal; logging means to log the data representative of the flow rate of water flowing into the consumer region and data representative of the output pressure from the pressure reducing valve, with time stamp data; and a communications module; the controller being configured to use the communications module at intervals to communicate logged data to the remote data processing system; the system being further characterized in that the remote data processing system receives the logged data from the controller and transmits the parameters to the controller at intervals; the remote data processing system further receives critical point pressure data from a pressure sensor adjacent the critical point, the critical point pressure data including time stamp data; and the remote data processing system calculates the parameters to be transmitted to the controller using the logged data received from the controller and the critical point pressure data.

As regards this aspect of the invention, the various optional features of the controller and system described earlier may be incorporated in this system, and where technically feasible it is not necessary for there to be time dependency in the relationship between flow rate and required output pressure, although that is the preferred arrangement.

It will further be appreciated that the use of a controller communicating with a remote data processing system provides advantages even when the parameters governing the required output pressure are related to time but not necessarily to flow rate. Thus, viewed from another aspect there is provided a system for adjusting the output pressure of a pressure reducing valve supplying water to a consumer region, comprising a controller and a remote data processing facility; wherein the controller comprises a control output for providing a signal to adjust the output pressure of the pressure reducing valve, a clock providing data representative of time, data storage means storing parameters representing a time dependent required output pressure from the pressure reducing valve in order to establish a desired minimum water pressure at a critical point in the consumer region, processing means configured to process (i) the data representative of time and (ii) the stored parameters, so that a signal is provided from the control output in order to cause the pressure reducing valve to be adjusted to provide the required output pressure corresponding to the time; characterized in that the controller further comprises an output pressure input for receiving an output pressure signal from an output pressure sensor, and with means adapted to provide data representative of the output pressure from the pressure reducing valve in accordance with the output pressure signal, logging means to log the data representative of the output pressure from the pressure reducing valve, with time stamp data, and a communications module, the controller being configured to use the communications module at intervals to communicate logged data to the remote data processing facility; the system being further characterized in that the remote data processing facility receives the logged data from the controller and transmits the parameters to the controller at intervals, the remote data processing facility further receives critical point pressure data from a pressure sensor adjacent the critical point, the critical point pressure data including time stamp data, and the remote data facility calculates the parameters to be transmitted to the controller using the logged data received from the controller and the critical point pressure data.

As regards this aspect of the invention, the various optional features of the controller and systems described earlier may be incorporated in this system, and where technically feasible it is not necessary for there to be a flow rate dependent required output pressure.

Viewed broadly from another aspect the invention provides a system for adjusting the output pressure of a pressure reducing valve supplying water to a consumer region, comprising a controller and a remote data processing facility; characterized in that the controller comprises a control output for providing a signal to adjust the output pressure of the pressure reducing valve; data storage means storing parameters representing a required output pressure from the pressure reducing valve in order to establish a desired minimum water pressure at a critical point in the consumer region in accordance with one or more measured values, processing means configured to process (i) data representative of the one or more measured values and (ii) the stored parameters, so that a signal is provided from the control output in order to cause the pressure reducing valve to be adjusted to provide the required output pressure corresponding to the measured values, an output pressure input for receiving an output pressure signal from an output pressure sensor, and means adapted to provide data representative of the output pressure from the pressure reducing valve, logging means to log the data representative of the output pressure from the pressure reducing valve, with time stamp data, and a communications module, the controller being configured to use the communications module at intervals to communicate logged data to the remote data processing facility; the system being further characterized in that the remote data processing facility receives the logged data from the controller and transmits the parameters to the controller at intervals, the remote data processing facility further receives critical point pressure data from a pressure sensor adjacent the critical point, the critical point pressure data including time stamp data, and the remote data facility calculates the parameters to be transmitted to the controller using the logged data received from the controller and the critical point pressure data.

The measured vales could, for example, be data representative of flow rate and/or time and/or environmental factors, as described earlier. In a preferred arrangement, the signal provided from the control output is such as to cause the pressure reducing valve to be adjusted to provide the required output pressure corresponding to the flow rate and the time. In general, as regards this aspect of the invention, the various optional features of the controllers and systems described earlier may be incorporated in the system, where technically feasible.

In some embodiments the remote data system further uses data relating to environmental factors when calculating the parameters to be transmitted to the controller. The environmental factors may include predicted weather conditions and/or water use restrictions and/or predicted variations in normal consumer water usage patterns.

In systems in accordance with various aspects of the invention, in preferred arrangements the control output of the controller is connected to a pilot valve for the pressure reducing valve. In some embodiments, the arrangement is such that in the event of failure of the pilot valve or the controller, a backup pilot valve is activated. Alternatively, but less preferably, the PRV is direct acting; i.e. does not require a pilot valve.

The parameters stored in the controller could be in a lookup table, which depending upon the particular aspect of the invention and the optional features used could be multi-dimensional. The processor would look up the required output pressure in accordance with the measured values of flow rate, time and so forth.

In an alternative arrangement, the stored parameters are used in a function processed by the processing means of the controller. Thus the function may include one or more constants, whose values are stored. The function which is evaluated by the controller may provide the desired output pressure directly or indirectly, and provide actual pressure data or other data which will result in the pilot valve controlling the output pressure from the pressure reducing valve to the correct value. The function may for example relate the flow rate and the pressure difference between the critical point and the pressure reducing valve output. Given a particular flow rate, this pressure difference will then be evaluated. Based on a stored value of the minimum required pressure at the critical point, the required PRV output pressure could then be calculated.

The minimum required pressure could vary as a function of time of day, time of year, temperature and so forth—for example either by storing different values in a lookup table for time/date, or by having a function which varies the minimum required pressure depending on time, date or any other factor. Alternatively, the function could account for the required pressure difference, so that for a given flow rate the required pressure output from the PRV is provided directly. The function could take into account variations of the required minimum pressure depending on time, date, or any other factor.

In an implementation of this type of embodiment, the controller may store a routine for evaluating a function using one or more parameters, i.e. constants, defining a best fit mathematical relationship between the measured flow rate and the required output pressure. For example, suppose that the output pressure $P_{Output}$ at the PRV necessary to ensure a minimum pressure $P_C$ at the Critical Point is related to the flow rate F by an equation such as the following:

$$P_{Output} = a + bF + cF^2$$

In a calibration phase, the values of a, b and c which provide a best fit relationship between the measured data for the particular region are determined, and are stored as parameters in the control means. In an implementation phase, the flow rate F is measured and the required output pressure $P_{Output}$ is calculated. The pressure adjusting means is then controlled to achieve this required output pressure $P_{Output}$.

In one possible embodiment, the equation defining the relationship is of the form:

$$P_{Output} = a + b(F)^c$$

However, this type of embodiment of the invention in its broadest sense is not restricted to any particular relationship.

The parameters to be calculated for use in a function may be generated automatically from calibration measurement data. This could be done by external data processing apparatus such as a laptop computer, personal digital assistant (PDA) or the like or a remote data processing facility. However, it would be possible for the parameters to be generated by a routine which runs within the controller itself. Thus, a microprocessor within the controller could generate the parameters from recorded data.

The recorded data concerning the flow rate could be generated by separate measuring means, stored separately and then supplied to whatever system is to calculate the parameters, whether a separate unit or the control means itself. Preferably, however, the controller itself receives the measurements directly from flow rate measuring means used also in the implementation phase, and stores these for use in calculating the parameters or for transmitting to a remote data processing system that will calculate them. The pressure measurements for the output from the PRV can be handled in a similar fashion.

As regards the pressure measurements at the critical point, in an arrangement using the controller to calculate parameters, these may be measured by a remote unit at the critical point but can be made available to the control means, for processing within the control means, in a number of ways. The data could be stored in a portable unit or transmitted to such a portable unit by means of a wired data connection or a wireless connection such as an Infra Red link, Bluetooth™ communications and so forth. The portable unit could be a simple storage device, a PDA or a laptop computer for example. From that portable unit, the measurements could be transferred to the control means, again via a wired or wireless connection. Alternatively, the data could be transmitted directly from the pressure measuring unit to the control means, either via a wired connection or by means of long range wireless communication, for example using a cellular data network. Such direct communications enables the calibration phase to take place with a reduced need for user intervention. The data to be transferred will consist of a data representative of the series of pressure readings, and data permitting time/date synchronization such as an associated time/date stamp. The data could be raw or derived data such as in a statistical package. The data could be compressed, encrypted and so forth. There could also be included, for example, data identifying the pressure measuring unit and for example the project being undertaken.

In a manually assisted method of calibration in an embodiment of this type, measurements are processed by an operative who selects a best fit curve, so that the associated parameters may be programmed into the control means. This may be an initial phase before automated calibration is used. In an automatic mode of calibration, the parameters are determined by a routine within the control means. Automatic calibration may be followed by periodic recalibration at suitable maintenance intervals. A fully automatic system would use automatic calibration automatically, at suitable intervals which can be relatively short, by means of a permanently installed remote pressure measuring unit which transmits measurements to the control means. As noted above, this can be over a long range wireless communications network using any appropriate protocol. In one embodiment of such an arrangement, SMS text messaging could be used.

In the most advanced configuration, with automatic calibration and a permanent remote pressure measuring unit supplying pressure data over an extended period, the parameters can be adjusted regularly to take into account varying conditions as consumer usage patterns change, the number or type of consumers change, and so forth. The system can adapt to these changing circumstances without the need for the intervention of expert engineers.

In accordance with aspects of the present invention where determination of the parameters to be stored in the controller is carried out by a remote data processing system, the methods described above may be implemented on the remote data processing system, which will receive the critical point pressure data by any of the methods described above, although preferably by means of direct communication. Calculation of the parameters, whether to be used in a function or to be included in one or more lookup tables, can be performed at the remote data processing facility using functions of the type referred to earlier, or by means of suitable statistical techniques using recorded data for pressure at the critical point, output pressure from the PRV, and other data such as measured flow rate and time. Suitable statistical techniques include, but are not limited to, linear or non-linear regression analysis, and learning approaches such as neural networks. The relative significance or contribution of various input data, such as weather and time, to determining the desired output pressure need not be known or assumed in advance, but may rather be learned, and optionally refined, from data obtained during a training period or continuously during use.

It will be appreciated that whilst reference has been made to a critical point, as noted earlier there may be more than one critical point, and the critical point where the supplied pressure is lowest may change. By using remote pressure measuring units at a number of potential critical points, the system will be able to ensure that the point which is the actual critical point at any particular time has its readings used to determine the parameters for a best fit relationship or other relationship. Other arrangements would be possible in which readings from a number of points are averaged.

Viewed from another aspect, the invention provides control means for a pilot valve of a water supply system pressure reducing valve which controls the output water pressure of the pressure reducing valve in accordance with a predetermined relationship between a required output flow pressure and flow rate, the predetermined relationship being defined by an equation which relates the desired output liquid pressure to a function of the flow rate which includes at least one constant, wherein the control means stores (a) the value of the or each constant and (b) a procedure for evaluating the function, so that for a given measured output flow rate from the pressure reducing valve the control means calculates the desired output liquid pressure by evaluating the function using the stored value of the or each constant and the measured output flow rate.

In a preferred arrangement, the stored values of the or each constant are time dependent, so that when evaluating the function at a particular time, the output flow pressure that is determined will depend on time.

In an implementation in accordance with any of the above aspects of the invention in which flow rate is used, the determination of the appropriate pressure for a given flow rate may be at any suitable interval, and could be almost continuous if there is frequent sampling of the flow rate, or at predetermined intervals such as multiples of seconds, minutes or even longer. Acting on a change in measured flow rate could be when there has been a change of a certain magnitude, and/or when a change has been in existence for a minimum period of time. Preferably, the control means is battery powered and can operate unattended for extended periods. For that reason, power expended on processing data, and on adjusting the pilot valve, should be reduced. Frequent adjustments are therefore preferably avoided.

It will be appreciated that although references are made to pressures and flow rates, in practice a system may work on raw data that is indicative of a pressure or flow rate, or on derived data which is a function of the raw data or calculated pressures or flow rates. The precise mathematical methods used are not material and routines which provide equivalent results by any manipulation of signals received from sensors are encompassed by the various aspects of the invention.

Thus, for example, a lookup table could store raw data values which concern the operation of an adjuster for a pilot valve, such as an angle of rotation which is not itself an acknowledged measure of pressure but will determine the output pressure. Similarly raw flow rate sensor data may be used when looking up the pressure related value, which as such does not provide the flow rate but can be processed if the flow rate is desired.

Although the invention has been described in relation to water, it will be appreciated that the various aspects are also applicable to flow control in the context of other liquids and indeed gases, and where technically feasible aspects of the invention encompass use in the context of such fluids. It will also be appreciated that a consumer region is not limited to a region comprising domestic consumers, and can encompass an industrial complex.

In the preferred systems in accordance with the invention, some or all responsibility for calculating how the pressure of water from a pressure reducing valve to a regional supply conduit varies in accordance with the flow rate, is borne by a central data processing facility. The central facility will analyze logged values such as flow rate, output pressure and pressure at one or more critical points, and will perform calculations such as those discussed earlier, to determine the appropriate relationship. Data will then be transmitted from the central facility to the control unit at suitable intervals, which will then adjust the pilot valve in dependence on the output pressure, in a manner determined by such data. This could be done by means of an algorithm using parameters sent from the central facility, but in a preferred arrangement the central facility transmits one or more tables of parameters to the control unit, so that the appropriate pressure for a given flow rate can be looked up. This reduces the processing that the control unit has to do.

In the preferred arrangement, the relationship between flow rate and pressure varies with time, such as time of day, time of year, or whether it is a weekend or a public holiday, and optionally also weather issues such as temperature or rainfall. The data supplied to the controller, such as lookup table data, can be multi-dimensional to take these aspects into account. The controller would have a clock/calendar as necessary to enable the correct value to be looked up, and/or weather sensors such as a temperature sensor, light sensor, or a rainfall sensor such as that used on cars to control windscreen wipers.

A remote central facility could itself take into account factors such as these, for example receiving data from meteorological stations, and transmit suitable parameters to the controller as necessary. However, in the preferred arrangement the controller itself has the clock/calendar and is provided with data which enable it to use the appropriate values depending on the time of day/week/year and so forth. This ensures that if there is a breakdown in communications, the controller will continue to operate and to give appropriate values for weekends and so forth. If the controller had to rely on, for example, a daily set of data from a central facility, failure in communications on e.g. a Saturday would result in inappropriate values being used for the weekend. Local monitoring of environmental conditions such as temperature is likely to be more accurate, and indeed timely, although the central facility could use predicted conditions when calculating the parameters to be sent to the controller.

Initially, the controller could be set up with "safe" starting data. The central facility would then monitor performance and the output of loggers, and use techniques such as those discussed earlier to determine variations to the parameters to give optimum performance. Typically there would be a continuous learning arrangement, with parameters being adjusted e.g. for the time of day initially in relatively large units—such as just day/night, or six or three hour periods—and then more finely—for example down to an hour. Similar adjustments could be made for the time of year, day of the week and so forth—for example the season, then the month, and then the week; and whether it is a weekday/weekend day, and then individual days. Starting with predicted parameters, the stored parameters could be changed as patterns are learnt.

The central facility could transmit data updates to the control unit at any predetermined intervals, such as daily, weekly, half daily, hourly and so forth, or on an irregular basis. To reduce processing and conserver battery power, a preferred compromise would be daily updates, and as noted earlier it is preferably the controller which initiates communications.

The central facility could take account of exceptional circumstances, such as sudden weather changes or other influences such as, for example, those that affect electricity demand—important sports matches for instance—as well as other factors such as the presence of a hosepipe and/or sprinkler ban. There could be a facility for e.g. the fire brigade to interact either with the central control station or a local control unit itself, to set the pressure to maximum, or to some other predetermined level, if for example there is a fire and water hydrants have to be used. The control unit itself could detect a sudden demand transient, and be able to recognize it as probably use of a fire hydrant, thus opening the supply valve fully. Similarly, there could be a facility for interaction by the water supply company in order to reduce the pressure to a minimum if, for example, a significant leak or other fault is discovered.

In general, the processing can be shared between the central data processing system and the local controller in any desired ratio, from most processing done locally to most or all processing done remotely at the central control station.

A central server/control station could handle a number of different controllers at different locations, with their associated loggers, in entirely separate supply regions or even parts of the country. Data communications between the central control station and a control unit or logger, may be by any suitable means including those discussed earlier.

The functionality of the central server/control station may be distributed among any number of physical servers in various different locations.

The control unit may include additional functionality, such as measuring water quality parameters such as Ph, conductivity, turbidity or dissolved oxygen, which can be reported back at desired intervals to the central control station.

Broadly speaking, from another aspect of the invention there is provided a process for controlling pressure adjusting means by control means so as to adjust the pressure of liquid supplied from a pressure reducing valve to a regional supply conduit in a system for controlling the pressure level in a liquid supply region, in which system the pressure reducing valve supplies liquid from a main supply conduit to a regional supply conduit serving a regional supply network for a number of liquid users in the region, the system including flow rate measuring means which measures the flow rate of liquid supplied from the pressure reducing valve to the regional supply conduit, and in which system the pressure adjusting means adjusts the pressure of liquid supplied from the pressure reducing valve to the regional supply conduit in dependence on the measured flow rate, wherein:

the control means is configured with data which has been derived by a remote control station from measurements of the pressure of liquid supplied from the pressure reducing valve to the regional supply conduit, the pressure of liquid in the regional supply network at a critical point, and the flow rate of liquid supplied from the pressure reducing valve to the regional supply conduit; and at intervals the control means is placed in communication with the remote control station and configured with updated data.

Preferably the control unit includes a clock and/or calendar, and the data supplied by the remote control station is such that the control unit can adjust the pressure of liquid supplied from the pressure reducing valve as a function of time.

In general, communications between components used in embodiments of the invention can be via wired connections such as a serial (RS232), Universal Serial Bus (USB), Firewire™, LAN or WAN, optical fiber connections and so forth; by short range wireless communications such as infra red (IrDA), inductive coupling, Bluetooth, Wi-Fi and so forth; or by long range communications using a suitable radio frequency and protocol, a cellular mobile communications network using for example SMS messaging, a wired communications network, and so forth. Communication between components may be direct, over a network such as the Internet, via a central control center and so forth. A component may be configured as a web server so that connection to it and access to data is simplified.

As regards arrangements in which a function is evaluated by the controller, there are various aspects of the invention.

Thus, viewed from one aspect there is provided a process for controlling the pressure level in a liquid supply region, in which a pressure reducing valve supplies liquid from a main supply conduit to a regional supply conduit serving a regional supply network for a number of liquid users in the region, there being flow rate measuring means which measures the flow rate of liquid supplied from the pressure reducing valve to the regional supply conduit, and pressure adjusting means which adjusts the pressure of liquid supplied from the pressure reducing valve to the regional supply conduit in dependence on the measured flow rate, wherein, in a calibration phase:

(a) first pressure measuring means are provided which measure the pressure of liquid supplied from the pressure reducing valve to the regional supply conduit;

(b) a critical point is chosen in the regional supply network, remote from the pressure reducing valve, and second pressure measuring means are provided which measure the pressure of liquid in the regional supply network at the critical point;

(c) over a period of time, measurements are taken by the flow rate measuring means, the first pressure measuring means and the second pressure measuring means, the measurements being synchronized with respect to time and being stored;

(d) using data processing means, the stored measurements are analyzed so as to establish at least one parameter for a function so as to define a best fit relationship between (i) data representing the difference between the pressure of liquid supplied from the pressure reducing valve to the regional supply conduit and the pressure of liquid in the regional supply network at the critical point and (ii) data representing the flow rate of liquid supplied from the pressure reducing valve to the regional supply conduit; and (e) the or each parameter is stored in control means for the means for adjusting the pressure of liquid supplied from the pressure reducing valve to the regional supply conduit;

and wherein, in an implementation phase, (g) there is measured the flow rate of liquid supplied from the pressure reducing valve to the regional supply conduit; and (h) for a measured flow rate, in accordance with the function and the or each stored parameter defining the best fit relationship, the control means determines an appropriate pressure for liquid supplied from the pressure reducing valve to the regional supply conduit in order to achieve a desired minimum pressure of liquid in the regional supply network at the critical point; and (i) the control means controls the pressure adjusting means so that liquid at the determined appropriate pressure is supplied from the pressure reducing valve to the regional supply conduit.

In one arrangement, the function defining a best fit relationship may be of the form:

$$P=a+b(F)^c$$

where P is a pressure, F is the flow rate, and a, b and c are the parameters.

Viewed from another aspect there is provided a process for configuring control means to be used in controlling pressure adjusting means for adjusting the pressure of liquid supplied from a pressure reducing valve to a regional supply conduit in a system for controlling the pressure level in a liquid supply region, in which system a pressure reducing valve supplies liquid from a main supply conduit to a regional supply conduit serving a regional supply network for a number of liquid users in the region, the system including flow rate measuring means which measures the flow rate of liquid supplied from the pressure reducing valve to the regional supply conduit, and in which system the pressure adjusting means adjusts the pressure of liquid supplied from the pressure reducing valve to the regional supply conduit in dependence on the measured flow rate, wherein the process comprises the steps of:

(a) providing first pressure measuring means which measure the pressure of liquid supplied from the pressure reducing valve to the regional supply conduit;

(b) choosing a critical point in the regional supply network, remote from the pressure reducing valve, and providing second pressure measuring means which measure the pressure of liquid in the regional supply network at the critical point;

(c) over a period of time, taking measurements using the flow rate measuring means, the first pressure measuring means and the second pressure measuring means, the measurements being synchronized with respect to time and being stored; and (d) configuring the control means by storing in the control means parameters for a function so as to define a best fit relationship between (i) data representing the difference between the pressure of liquid supplied from the pressure reducing valve to the regional supply conduit and the pressure of liquid in the regional supply network at the critical point and (ii) data representing the flow rate of liquid supplied from the pressure reducing valve to the regional supply conduit;

wherein:

the control means is adapted such that for a measured flow rate, in accordance with the function and the or each stored parameter defining the best fit relationship, the control means will determine an appropriate pressure for liquid supplied from the pressure reducing valve to the regional supply conduit in order to achieve a desired minimum pressure of liquid in the regional supply network at the critical point; and the control means will control the pressure adjusting means so that liquid at the determined appropriate pressure is supplied from the pressure reducing valve to the regional supply conduit.

Viewed from another aspect there is provided control means for use in controlling pressure adjusting means for adjusting the pressure of liquid supplied from a pressure reducing valve to a regional supply conduit in a system for controlling the pressure level in a liquid supply region, in which system the pressure reducing valve supplies liquid from a main supply conduit to a regional supply conduit serving a regional supply network for a number of liquid users in the region, the system including flow rate measuring means which measures the flow rate of liquid supplied from the pressure reducing valve to the regional supply conduit, and in which system the pressure adjusting means adjusts the pressure of liquid supplied from the pressure reducing valve to the regional supply conduit in dependence on the measured flow rate, wherein:

the control means is configured with at least one parameter which has been derived from synchronized measurements of the pressure of liquid supplied from the pressure reducing valve to the regional supply conduit, the pressure of liquid in the regional supply network at a critical point, and the flow rate of liquid supplied from the pressure reducing valve to the regional supply conduit; the at least one parameter being for a function so as to define a best fit relationship between (i) data representing the difference between the pressure of liquid supplied from the pressure reducing valve to the regional supply conduit and the pressure of liquid in the regional supply network at the critical point and (ii) data representing the flow rate of liquid supplied from the pressure reducing valve to the regional supply conduit;

the control means is adapted to receive measurements of the flow rate of liquid supplied from the pressure reducing valve to the regional supply conduit;

and wherein:

the control means is adapted such that for a measured flow rate, in accordance with the function and the or each stored parameter defining the best fit relationship, the control means will determine an appropriate pressure for liquid supplied from the pressure reducing valve to the regional supply conduit in order to achieve a desired minimum pressure of liquid in the regional supply network at the critical point; and the control means will control the pressure adjusting means so that liquid at the determined appropriate pressure is supplied from the pressure reducing valve to the regional supply conduit.

Viewed from another aspect there is provided a process for controlling pressure adjusting means by control means so as to adjust the pressure of liquid supplied from a pressure reducing valve to a regional supply conduit in a system for controlling the pressure level in a liquid supply region, in which system the pressure reducing valve supplies liquid from a main supply conduit to a regional supply conduit serving a regional supply network for a number of liquid users in the region, the system including flow rate measuring means which measures the flow rate of liquid supplied from the pressure reducing valve to the regional supply conduit, and in which system the pressure adjusting means adjusts the pressure of liquid supplied from the pressure reducing valve to the regional supply conduit in dependence on the measured flow rate, wherein:

the control means is configured with at least one parameter which has been derived from synchronized measurements of the pressure of liquid supplied from the pressure reducing valve to the regional supply conduit, the pressure of liquid in the regional supply network at a critical point, and the flow rate of liquid supplied from the pressure reducing valve to the regional supply conduit; the at least one parameter being for a function so as to define a best fit relationship between (i) data representing the difference between the pressure of liquid supplied from the pressure reducing valve to the regional supply conduit and the pressure of liquid in the regional supply network at the critical point and (ii) data representing the flow rate of liquid supplied from the pressure reducing valve to the regional supply conduit;

the control means receives measurements of the flow rate of liquid supplied from the pressure reducing valve to the regional supply conduit;

and wherein:

for a measured flow rate, in accordance with the function and the or each stored parameter defining the best fit relationship, the control means determines an appropriate pressure for liquid supplied from the pressure reducing valve to the regional supply conduit in order to achieve a desired minimum pressure of liquid in the regional supply network at the critical point; and the control means controls the pressure adjusting means so that liquid at the determined appropriate pressure is supplied from the pressure reducing valve to the regional supply conduit.

Viewed from another aspect there is provided control means for a pilot valve of a liquid supply system pressure reducing valve which controls the output liquid pressure of the pressure reducing valve in accordance with a predetermined relationship dependent on the output flow rate from the pressure reducing valve, the predetermined relationship being defined by a function which relates the desired output liquid pressure to the flow rate and which includes at least one constant, wherein the control means stores (a) the value of the or each constant and (b) a procedure for evaluating the function, so that for a given measured output flow rate from the pressure reducing valve the control means calculates the desired output liquid pressure by evaluating the function using the stored value of the or each constant and the measured output flow rate.

It will be appreciated that many of the features of these various aspects of the invention are applicable to arrangements in which the control means looks up values to be used in adjusting the output pressure of a pressure reducing valve.

The invention may be viewed from various aspects, including the controllers, methods of operating the controllers, the system, methods for operating the systems, such as a method of adjusting the output pressure of a pressure reducing valve supplying water to a consumer region, using a system, a remote data processing system, a method of operating a remote data processing system, a controller in combination with a pilot valve for a pressure reducing valve, a controller in combination with a pilot valve and a pressure reducing valve and so forth.

It will also be appreciated that some of the embodiments of controllers, systems and methods in accordance with the various aspects of the invention incorporate features which may be used outside of the context of those aspects.

For example, in accordance with an invention disclosed, there is provided a controller for adjusting the output pressure of a pressure reducing valve supplying water to a consumer region, wherein the controller comprises: a control output for providing a signal to adjust the output pressure of the pressure reducing valve; data storage means storing parameters representing a relationship between a plurality of measured values and a required output pressure from the pressure reducing valve in order to establish a desired minimum water pressure at a critical point in the consumer region; and processing means configured to process (i) data representative of the measured values and (ii) the stored parameters, so that a signal is provided from the control output in order to cause the pressure reducing valve to be adjusted to provide the required output pressure corresponding to the measured values; characterized in that one of the measured values is an environmental factor.

As discussed earlier, an environmental factor could be temperature, rainfall and so forth. Another measured value could be flow rate and/or time, used in a manner as discussed earlier. Alternatively, a measured value could be the pressure measured at the critical point.

In accordance with another invention disclosed, there is provided a controller for adjusting the output pressure of a pressure reducing valve supplying water to a consumer region, wherein the controller comprises: a control output for providing a signal to a pilot valve to adjust the output pressure of the pressure reducing valve; data storage means storing parameters representing a relationship between at least one measured value and a required output pressure from the pressure reducing valve in order to establish a desired minimum water pressure at a critical point in the consumer region; and processing means configured to process (i) data representative of the or each measured value and (ii) the stored parameters, so that a signal is provided from the control output in order to cause the pilot valve to adjust the pressure reducing valve to provide a required output pressure corresponding to the or each measured value; characterized in that either:

(i) a backup pilot valve is provided for adjusting the pressure reducing valve, and the controller is configured to activate the backup pilot valve in the event of an error being detected in the controller or in the pilot valve; and/or (ii) the controller is provided with an input for data representative of the flow cross section through the pressure reducing valve; and/or (iii) the controller is provided with an input for data representative of the operating range of a movable main valve member in the pressure reducing valve; and/or (iv) the controller is provided with data representative of the pressure drop across a filter in the water supply to the consumer region.

In preferred embodiments, the moveable main valve closure member is prevented from reaching positions outside the operating range. This range is preferably set so as to minimize the likelihood of turbulent flow and/or cavitation occurring within or downstream of the PRV. In some embodiments, the operating range is 10%-75% open.

These are example only of novel technical features which can be used in contexts other than those described and which are inventive in their own right.

For example, in a system in which the output pressure is dependent on flow rate, another invention disclosed deals with a problem that has been identified when water is being supplied at high pressure, and then the pressure drops suddenly, for example as a result of the region including pumps which stop suddenly or as a result of the PRV output changing suddenly for another reason. In such a situation, the potential energy in the system continues to feed consumers in the region, but the flow rate detected at the controller drops considerably. If that drop in flow rate is used to reduce the output pressure of the pressure reducing valve to an even lower value, as would be consistent with an established relationship between flow rate and required output pressure, there will be insufficient pressure to meet the resumed demand once the available potential energy in the system has been dissipated.

Thus, in accordance with another invention disclosed, there is provided a controller for adjusting the output pressure of a pressure reducing valve supplying water to a consumer region, wherein the controller comprises: a control output for providing a signal to a pilot valve to adjust the output pressure of the pressure reducing valve; means for providing data representative of flow rate; data storage means storing parameters representing a relationship between flow rate and a required output pressure from the pressure reducing valve in order to establish a desired minimum water pressure at a critical point in the consumer region; and processing means configured to process (i) the data representative of flow rate and (ii) the stored parameters, so that a signal is provided from the control output in order to cause the pilot valve to adjust the pressure reducing valve to provide a required output pressure corresponding to the flow rate; characterized in that, following a transient pressure drop and a transient drop in flow rate to a value below that which is consistent with consumer demand, the output pressure is maintained at a value above that corresponding to the measured data representative of flow rate, pending resumption of a flow rate which is consistent with consumer demand.

In terms of a pilot valve for use in a system in accordance with the invention, there is described herein a pilot valve having novel features, and thus viewed from another aspect the present invention provides a pilot valve which may be used with the systems and controllers discussed above but may be used with any other arrangement also, including known arrangements, the pilot valve being or controlling operation of a hydraulically-actuated pressure reducing valve, and including a housing, a first valve member mounted in the housing for movement relative to the housing and to a second valve member in response to the outlet pressure of the pressure reducing valve, and an adjuster for adjusting the position of the second valve member relative to the housing, the pilot valve being adapted to control operation of the pressure reducing valve according to the relative positions of the first and second valve members, characterized in that one of the first and second valve members includes an aperture, and the other of the first and second valve members includes a blocking portion arranged for relative sliding movement across the aperture so that the relative movement between the first member and the second member varies the flow cross section through the aperture, the adjuster determining the flow cross section of the aperture that will be provided for a given relative position of the first and second valve members.

Thus, in use, for a given output pressure of the PRV in an equilibrium state, there will be a corresponding effective flow cross section of the aperture determined by the amount of the aperture that is blocked by the blocking portion. If the adjuster is then used to slide the blocking portion relative to the aperture, so that the effective cross section of the aperture is changed, there will be a change in flow through the pilot valve and the output pressure of the pressure reducing valve will be altered. For a chosen output pressure of the PRV, that pressure is maintained by the valve members moving relative to each other so that the amount of the aperture that is blocked by the blocking portion will vary. This has been found to provide more accurate and reliable control than with conventional arrangements.

The adjuster may provide relative sliding movement between the blocking portion and the aperture in the direction of relative movement of the valve members in response to the outlet pressure of the pressure reducing valve. This may be achieved by the use of a threaded member, rotation of which cause longitudinal movement of the blocking portion or aperture. In a preferred embodiment, however, the adjuster provides relative rotation of the blocking portion and aperture. In one possible arrangement, relative rotation between the aperture and the blocking portion would cause the aperture to be progressively blocked or opened by movement of an edge of the blocking portion across the aperture, in the direction of relative rotation. In a preferred arrangement, however, the arrangement is such that relative rotation between the aperture and the blocking portion will cause the aperture to be progressively blocked or opened by movement of an edge of the blocking portion across the aperture, in the direction of the axis of rotation. Thus, the blocking portion may have an axial extent which varies in the circumferential direction. In such an arrangement, an axially facing end portion of the blocking portion will be provided with a suitable profile. The profile could be a straight line, a curve, or any other desired profile to provide the required manner of variation of the flow cross section of the aperture in response to relative rotation. In a preferred arrangement, an end surface of the blocking portion is provided with a ramp profile. When there is relative rotation, a different part of the profile extends across the aperture and causes apparent movement of an edge across the aperture.

There may be a plurality of apertures with a plurality of associated blocking portions. The blocking portions may be provided on a single member. In one preferred arrangement, a rotatable blocking member is provided with a plurality of blocking portions, each having a longitudinally directed end region having an axial extent which varies in the circumferential direction. In a practical example, it has been found that an arrangement with two diametrically disposed apertures and two rotationally-symmetrical blocking portions gives satisfactory results.

In one preferred arrangement, the first valve member is arranged for longitudinal movement in response to the outlet pressure of the pressure reducing valve, and is provide with the aperture. The second valve member is fixed except to the extent that there is movement of the blocking portion effected by the adjuster. Preferably, in this arrangement, the second valve member is arranged for rotation with respect to the housing, so as to control the flow cross section of the aperture by sliding the blocking portion across the aperture.

The first valve member may be in the form of a longitudinally extending tubular member which is in fluid communication with the outlet pressure of fluid from the pressure reducing valve and which has an outlet aperture controlled by the blocking portion, the outlet aperture being in communication with a chamber of the pressure reducing valve.

In one preferred arrangement, the pilot valve comprises three chambers arranged along an axis, namely a first chamber, a second or middle chamber, and a third chamber. The first chamber is in fluid communication with the outlet pressure of the pressure reducing valve and is provided with a spring biased flexible diaphragm, which deflects along the axis as the pressure fluctuates. The first valve member is mounted for movement with the flexible diaphragm. The first valve member is in the form of a tube which extends along the axis, through the middle chamber and opens into the third chamber. The tube has a radially directed aperture which opens into the middle chamber, the middle chamber being in fluid communication with a chamber of the pressure reducing valve. The middle chamber is separated from the first chamber by a first flexible seal and from the third chamber by a second flexible seal. The first chamber is connected to the third chamber via a conduit, so that the third chamber is exposed to the outlet pressure of fluid from the pressure reducing valve. This fluid is exposed to the open end of the tube of the first valve member, and thus the aperture.

In such an arrangement, the second valve member is in the form of a generally cylindrical plug mounted in the tube in the region of the aperture, where the tube is of circular cross section, the plug having a profiled end facing the inlet into the tube from the third chamber. The plug is in sealing engagement with the wall of the tube and is rotatable about the longitudinal axis of the tube so as to vary the extent to which the plug blocks the aperture. The arrangement may be such that the aperture can be fully open or progressively blocked as the plug is rotated. There may be a position in which the aperture is fully closed.

In a preferred arrangement, the portion of the tube below the plug is provided with an opening into the first chamber, so that the pressures on either side of the plug are substantially equal. This avoids pressure differentials that might hinder rotation of the plug.

Certain preferred embodiments of the invention will now be described, by way of example only, with reference to the accompanying drawings, in which:

FIG. 4 is a cross-sectional view of a pilot valve according to aspects of the invention;

FIG. 5 is a cross-sectional view of a spindle inside the pilot valve; and

Figure 1:
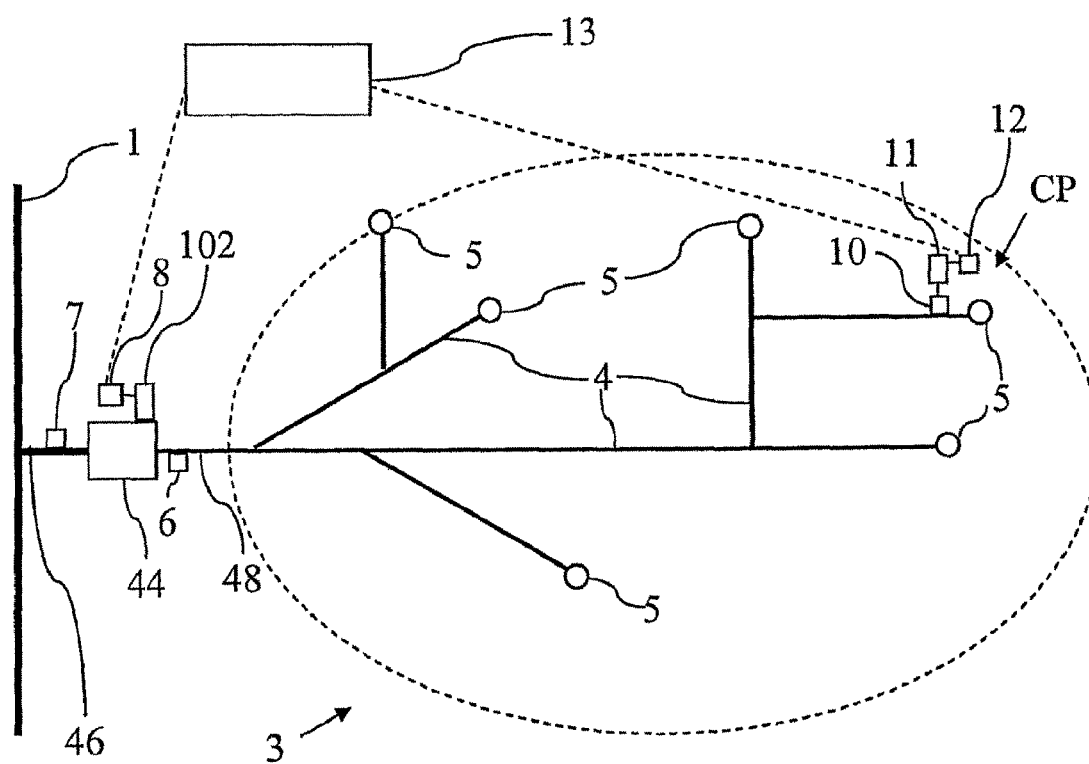
FIG. 1 is a schematic diagram of a water distribution system in accordance with aspects of the present invention.

Referring now to the drawings, FIG. 1 shows a main arterial water supply conduit 1 which supplies water at a pressure P1 to a pressure reducing valve (PRV) 44 via a pipe 46, which in turn supplies water at a reduced output pressure P2 to a district metering area (DMA) 3 via output pipe 48, the DMA including a number of conduits 4 supplying a number of consumers 5. One of the consumers 5 is designated a critical point CP, being a point where the pressure P3 will typically be lower than elsewhere in the DMA 3 as a result of the distance of the Critical Point CP from the PRV 44 and/or the altitude of the Critical Point with respect to the PRV. Although only one Critical Point is indicated in the present embodiment, other embodiments may have multiple Critical Points.

Adjacent the PRV 44 are provided a first pressure measuring sensor 6 for measuring the output pressure P2 of the PRV, and a flow rate sensor 7 for measuring the flow rate M through the PRV. The flow rate sensor 7 is installed upstream of the PRV to reduce inaccuracies due to turbulent flow.

The signals from sensors 6 and 7 are fed to a control unit 8 for a pilot valve 102 which in a preferred embodiment adjusts the output pressure of the PRV in accordance with the measured flow rate and time in a manner described below, with the intention of providing an output pressure which is sufficient to maintain a required minimum pressure at the critical point.

The measured flow rate M and the output pressure P2 are transmitted from the control unit 8 over a wireless communications network to a remote central control station 13 where there is a data processing facility.

At the Critical Point CP is a second pressure measuring sensor 10 for measuring the pressure P3 at the Critical Point which is used in a calibration process as discussed below. It is connected to a data logger 11. The remote pressure sensor 10 and logger 11 may be a dedicated rugged integrated pressure transducer and logger with embedded software enabling statistical analysis. The sensor may be a temporary or a permanent installation. Information stored on the data logger might be retrieved manually by an engineer, who will connect to the logger by any suitable wired or short- or long-range wireless means. However, preferably the logger is connected to a communications unit 12 which, at intervals, transmits data by SMS or another suitable wireless means to the central control station 13 which processes the P3 data together with the P2 pressure data and the flow rate data received from the control unit 8, in order to transmit suitable control parameters to the control unit so that tat the output pressure of the PRV 44 will be controlled to provide the required pressure at the Critical Point.

Figure 2:
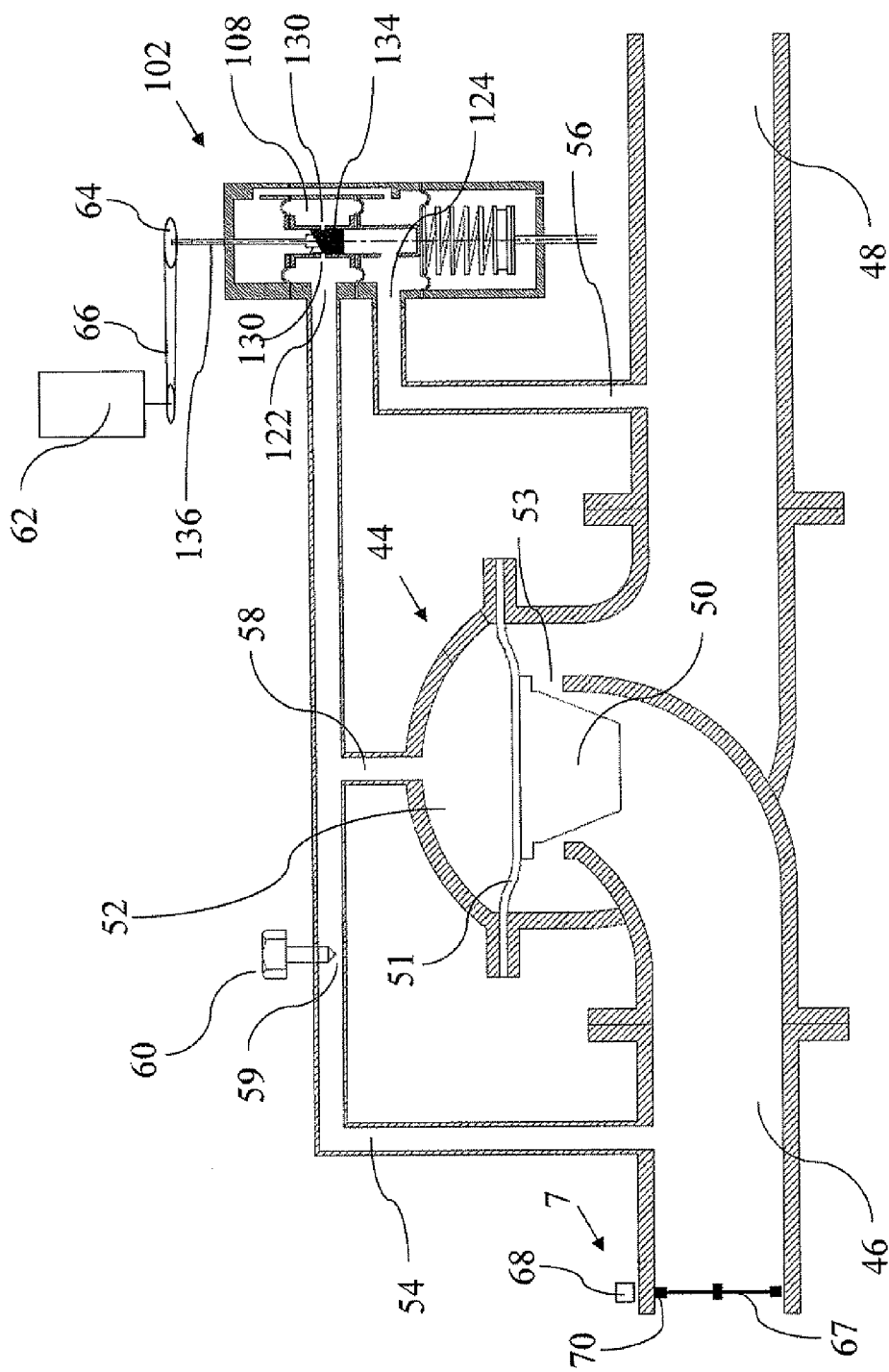
FIG. 2 is a cross-sectional schematic view of a pilot valve connected to a main pressure reducing valve, with the PRV in an open state.

FIG. 2 shows a portion of a pipe system comprising the (PRV) 44, in an open state, connected to the pilot valve 102 which is described below in more detail with reference to FIGS. 4 and 5. The PRV sits between the upstream pipe 46 connected to the main arterial water supply conduit 1, and the downstream pipe 48 connected to the district metering area. A valve member 50 is provided on a diaphragm 51 which forms one side of a PRV control chamber 52. The valve member serves to control flow through an orifice 53 connecting the upstream and downstream pipes 46 and 48. A passage 54 connects the upstream pipe 46 to the inlet opening 122 of the pilot valve 102 and to the PRV control chamber 52 via a conduit 58. A passage 56 connects the outlet opening 124 of the pilot valve to the downstream pipe 48. The passage 54 is provided with a restriction 59 upstream of the conduit 58 and the pilot valve, the restriction being set by means of a screw 60.

A motor 62, for example a stepper or other suitable motor, is connected by a drive-belt 66 to a gearwheel 64. This gearwheel is attached to an adjuster 136 so as to cause rotation of the valve member 134 on activation of the motor 62 and adjust the flow cross section through apertures 130. The motor 62 is connected to an output of the control unit 8.

The pressure in the PRV control chamber 52 can vary between the upstream, inlet pressure P1 and the downstream, output, pressure P2 depending on the flow cross section of the pilot valve apertures 130 and the flow cross section at the restriction 59. In FIG. 2, the apertures 130 are shown completely open and the PRV is therefore completely open.

The flow meter 7 is located adjacent the PRV 44 in the upstream pipe 46. It may be of any suitable design, such as a differential pressure flow meter, a venturi tube, an orifice plate, etc. In the present embodiment an axial turbine rotor 67 is used. It has a magnet 70 on the tip of each vane, the passage of which is detected by a flow meter sensor unit 68 equipped with a reed switch or other sensing means such as a Hall effect sensor. The flow meter sensor unit 68 may calculate the flow from the reed switch activations by any standard approach. It may for example count the number of pulses over a time period, or it may use a pulse interval timing approach where the time interval between successive leading or trailing edges of pulses is determined. Preferably, the flow meter sensor unit is arranged to switch from calculating an averaged pulse count to timing a pulse interval when the flow is determined to be below a predetermined level.

In embodiments in which means are provided for determining information relating to the position of the valve closure member 50, either directly or indirectly, this information may be used to infer the flow rate through the pressure reducing valve by estimating the flow cross-section, or orifice size, in the PRV. This approach therefore provides an alternative to using the flow meter 7, which could then be dispensed with. More preferably, however, such an indirect flow rate sensing mechanism is used as a backup, able to detect failure of the principal flow rate sensor 7 and/or take over therefrom in case of such failure.

Figure 3:
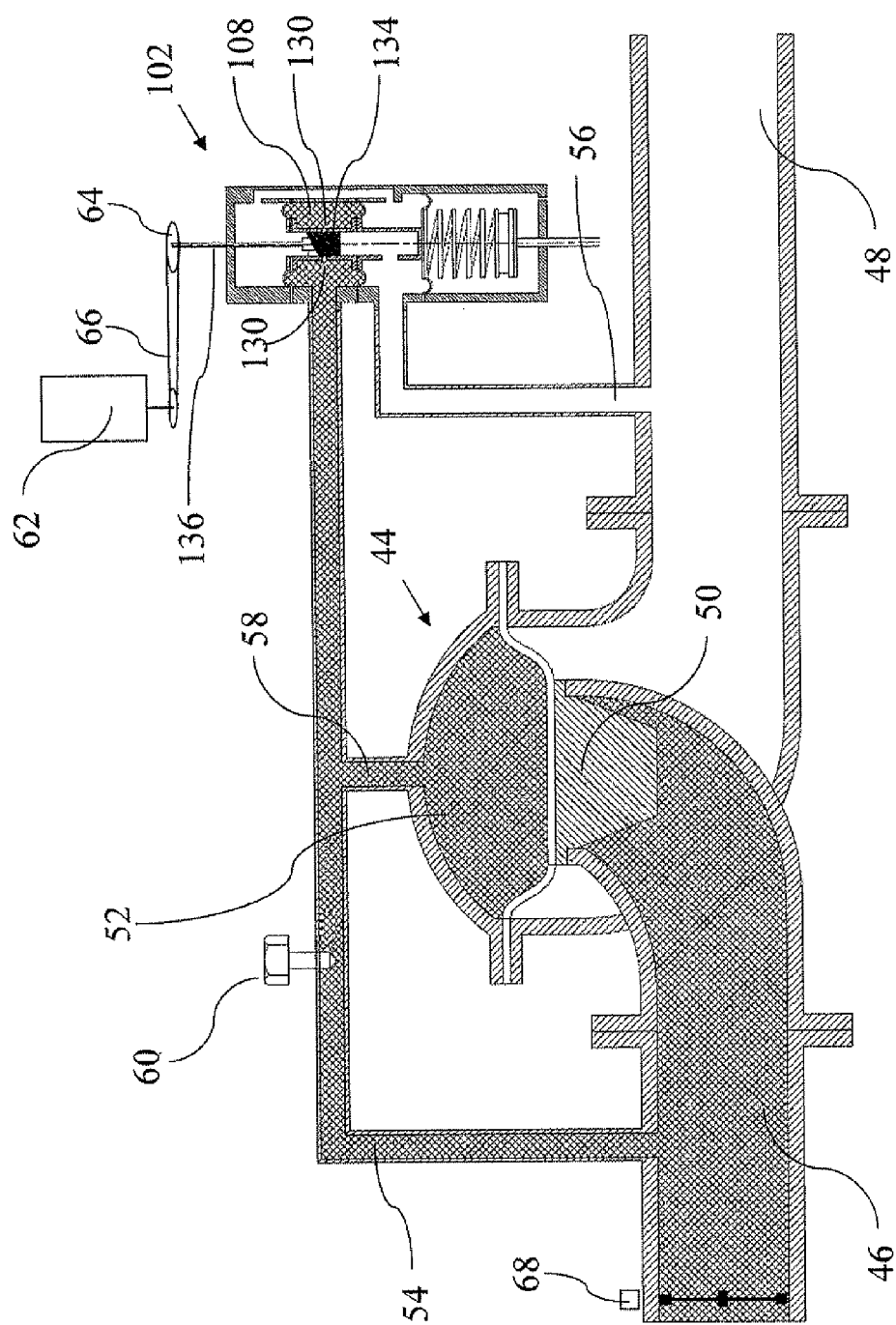
FIG. 3 is a cross-sectional schematic view of a pilot valve connected to the main pressure reducing valve, with the PRV in a closed state.

FIG. 3 shows the system of FIG. 2 with the apertures 130 completely closed and the PRV 44 completely closed as a result. When the pilot valve is closed, the pressure of the fluid in the PRV control chamber 52 and in upper chamber 108 of the pilot valve is equal to the pressure in upstream pipe 46.

Flow through the pilot valve is partly limited by the diameter of passage 54, which can be set by adjusting restriction 59 by means screw 60. When the apertures 130 are partially or fully open and the system has reached an equilibrium state, the ratio of the flow cross section of the apertures to the flow cross section at the restriction 59 determines the pressure within the PRV control chamber 52.

In use, the output pressure P2 in pipe 48 is adjusted by rotating the adjuster 136 to rotate the valve member 134 relative to the tubular member 127, thus altering the amount to which the apertures 130 are blocked, and thus the effective flow cross section of the apertures. Thus, for a given longitudinal position of the valve member 134 relative to the tubular member 127, the effective flow cross section can be varied. Whatever relative rotational position is provided, equilibrium will be reached with an appropriate output pressure P2 established. Rotation in one sense will increase the output pressure P2, and in the other will decrease the output pressure. In the arrangement shown, rotation of the valve member 134 clockwise when viewed from above will cause more of the apertures 130 to be uncovered and will increase the output pressure P2. Counter-clockwise rotation will cause more of the apertures 130 to be blocked, and thus will decrease the output pressure P2. The extremes are as shown in FIG. 2 (apertures fully open and PRV fully open) and FIG. 3 (apertures fully closed and PRV fully closed).

Referring now to FIG. 4, there is shown a cross section through the pilot valve 102. The pilot valve comprises a broadly cylindrical valve body 104, substantially closed at its top and bottom ends and defining a vertical axis 105. The interior of the valve is divided into a top chamber 106, a middle chamber 108, and a lower chamber 110, and a spring-containing chamber 112 which contains a coil spring 138. The chambers are separated from each other internally by flexible seals in the form of membranes 114, 116 and 118, which are annular and lie perpendicular to the axis. A passageway 120 connects the top chamber 106 to the lower chamber 110. The middle chamber 108 is provided with an inlet opening 122 through the valve body which is connected to a chamber of the pressure relief valve as described above, and the lower chamber 110 is provided with an outlet opening 124 which is connected to the outlet side of the pressure relief valve. An aperture 126 connects the spring containing chamber to the exterior of the valve.

A cylindrical tubular member 127 of circular cross section is entirely enclosed within the valve body and is attached to the three flexible membranes. The axis of the tubular member 127 extends along the axis 105 of the valve body. The bottom of the tubular member 127 is connected to the membrane 118 and the spring 138, the bottom of which is connected to the valve body by means of an tensioning screw 140. The spring and tensioning screw extend along the same axis 105.

The upper part of the interior 128 of the tubular member 127 is open to the upper chamber 106 and is provided with the two diametrically-opposed orifices 130 which open into the middle chamber 108. The lower part of the interior 128 of the tubular member 127 is connected to the lower chamber by an opening 132. This serves to balance pressures and to avoid hydraulic locks within the interior 128 of the tube.

The cylindrical valve member 134 sits snugly within the tubular member 127, in a substantially sealing fashion, and extends along the axis 105. It is mounted at one end of the elongate adjusting member 136, which extends along the axis 105 and passes through the top of the valve body. The adjusting member 136 is mounted for rotation about the axis 105.

FIG. 5 shows a more detailed view of the valve member 134 and the tubular member 127 of FIG. 4. The top face of the valve member 134 is provided with two symmetrically arranged ramp profiles 142, each being inclined from a highest point to a lowest point, around the circumference of the valve member. When the diaphragm 118 moves, the tubular member 127 moves along the axis 105. The apertures thus move axially with respect to the valve member 134 so that more or less of the apertures is blocked by ramp profiles. Rotation of the adjusting member 136 rotates the valve member 134 and thus the portion of the ramp profile 142 that extends across the aperture is altered. Since the ramp profiles are inclined with respect to the circumferential direction, the area of the apertures that is blocked increases or decreases depending on the direction of rotation. This therefore controls flow between the openings 122 and 124.

Figure 6:
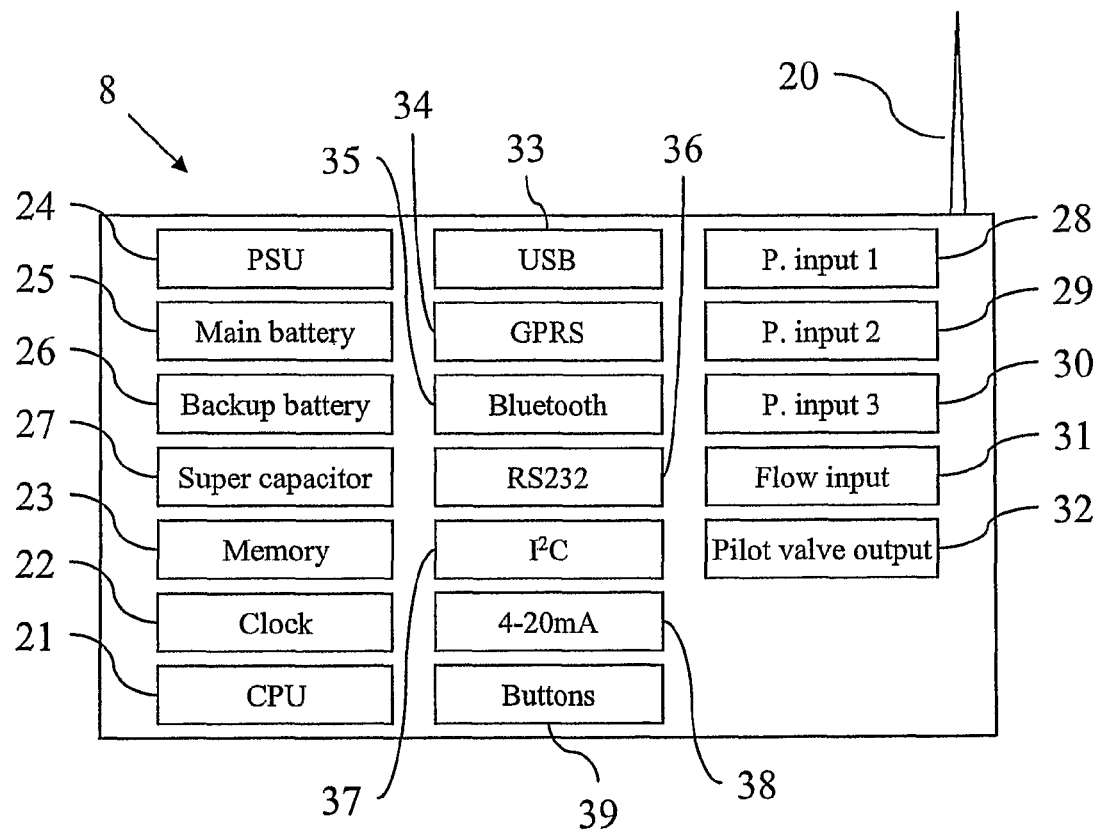
FIG. 6 is a schematic diagram of a controller in accordance with aspects of the present invention.

FIG. 6 shows a schematic diagram of the control unit 8. Externally, it has an antenna 20 for wireless communication, a manual user interface for engineers comprising buttons 39, and ports for connecting to various sensors. Internally, the control unit 8 has a central processing unit 21 and memory 23, which may include some non-volatile memory. There is a clock 22 for providing the time and date to the CPU 21. The time and date may be updatable from a time server, for example at the central data processing facility 13 or via another remote communications link. A power supply unit 24 is provided for connection to an external power source. As it is unlikely that there will be a permanent power connection at the installation site, this is envisaged for use when the unit is elsewhere during initial configuration and any subsequent diagnostic work. The primary power is derived from a main battery 25, which may be of any suitable type, but is preferably lithium-based. A backup battery 26 is provided. Although not shown in the present embodiment, a solar cell may also be provided. A supercapacitor 27 provides a further reserve of electrical power, intended for the specific purpose of providing a sudden burst of power to activate a valve diverting flow from the primary controllable pilot valve 102 to a simpler, fixed-pressure backup pilot valve (not shown), for example using a solenoid. This could be triggered by a watchdog mechanism operable to detect a fault in the primary pilot valve or in the control unit 8, or if the main battery 25 and/or backup battery 26 were running low.

The control unit 8 has various I/O connections and communication mechanisms. Inputs include ports 28, 29, 30 for connection to pressure sensors and a port 31 for connection to the flow sensor. Pressure input 1 (28) is connected to the P2 pressure sensor 6; and flow input 31 to the PRV flow meter 7. Pressure input 2 (29) is connected to a sensor for the P1 pressure into the PRV, if such is provided. Pressure input 3 (30) may be connected to a differential pressure sensor arranged to monitor the pressure drop across a filter; or it may be used to monitor pressure in the PRV control space; or it may be reserved for a future application.

A pilot valve output port 32 is connected to the motor 62 for adjusting the pilot valve 102.

Two wireless communication modules are provided: GPRS 34 for long-range communication to the central server 13, and Bluetooth 35 for local connections.

Various wired connections are also possible, using the USB module 33, an I2C serial module 37 and an RS232 serial module 36. Four 20 mA wired connections 38 are provided. These wired connections may be diagnostic purposes, or for connecting additional sensors, such as rain, temperature or light sensors, or other additional modules. Other input/output mechanisms such as IrDA, an LCD display, a keyboard, etc. may be provided, but are not shown.

An optional mode of operation by the control unit 8 is "remote controlled" pressure modulation. In essence, this involves the control unit 8 monitoring and adjusting the P2 pressure output depending on the deviation from a set-point P3 pressure. To avoid problems due to un-predictable lag between changes in P2 and resultant P3 pressures, a "live" remote P3 pressure input is used with a built-in algorithm to constantly refine the relationship between flow and P2-P3. In this type of system, the control unit 8 receives the P3 values from the remote pressure sensor 10 either directly or via the central control facility 13.

However, the standard mode of operation in the present embodiment is for the control unit 8 to adjust the PRV output pressure P2 based on the sensor inputs, and in particular the measured flow rate M and the time T output by the clock 22, as well as any other relevant environmental sensor inputs, in accordance with parameters stored in the memory 23, which have been retrieved from the central server 13. A preferred arrangement for the control unit 8 to use these stored parameters is via a lookup table having axes for flow rate bands and time bands, and having numerical entries giving appropriate PRY output pressures P2. The lookup table might be three- or multi-dimensional, including axes for light intensity, a rain sensor, temperature, or other local environmental inputs. An alternative to using one or more lookup tables is for the CPU to evaluate a function which involves measured values and constants which are stored parameters.

The parameters are referred to by a controller program running on the processor 21, which determines the desired P2 pressure (possibly taking further constraints into account, such as the physical range of the PRV valve member, P1 pressure, or a pressure-change damping factor, as explained in more detail below) and sends the appropriate signals to the pilot valve motor 62 via the pilot valve output port 32. The P2 pressure input port 28 can supply feedback for this adjustment process. A P1 pressure input measurement at port 29 may be used to avoid the control unit 8 attempting to achieve a P2 pressure greater than P1, which would typically not be physically possible.

The speed of response to changes in flow rate and the associated changes in P2 are preferably controlled by a damping variable to limit the speed of change in pressure into the DMA.

The stored parameters are generated and loaded into the control unit 8 memory 23 as follows.

Especially in an initial setup phase, an engineer could manually determine the parameters based on DMA size, historical flow rates, distance and height difference to critical point, and use, for example, a PC or SMS interface to load these onto the control unit 8. Simple rules could be used to estimate the relationship variables. The engineer could use suitable software to assist in determining the parameters.

Manual parameter setting may be adjustable by, for example: direct user interface by LCD display menu on the controller; a received mobile text (SMS) message sent from a central control unit; commands sent over a mobile data service such as GPRS; or a PC interface through wired serial (RS232), infrared serial (IrDA) interface or optional short range wireless interface with a user friendly Graphical User Interface (GUI).

In normal usage, and optionally even at initial installation, the parameters or incremental updates thereto, are transmitted at intervals from the central server 13. This communication is preferably initiated by the control unit 8.

The parameters preferably take the form of one or more discrete lookup tables, as already described. They may, however, describe or parameterize a continuous curve or multi-dimensional surface, or parameterize some other relationship model, such as a neural network.

Although in some embodiments, the control unit 8 itself may generate appropriate parameters from raw data, in the present embodiment, the primary analysis of data is conducted on the central server 13. Typically initial training data will be gathered over a one or two week time period, but this period may be longer to capture seasonal effects, or several distinct sets of training data may be gathered. The measurements of P2 and the flow rate M are logged on the integral data logger in the control unit 8, and transmitted at intervals to the central facility 13. P3 at the Critical Point as logged on the remote data-logger 11 associated with sensor 10 located at the Critical Point. The remote logger is synchronized with the control unit 8, directly or indirectly—by both being synchronized with a clock at the central facility 13—before the data gathering period to ensure both units have synchronized clocks. After the data gathering period, the remote data logger 11 downloads the P3 data by, for example direct serial connection (RS232 or IrDA) or by SMS or other means to the central server 13. The central server 13 analyses the relationship of P2-P3 to differing flow rates M and times T, optionally also taking into account other factors that may be relevant, such as weather conditions, sports fixtures, factory usage information, etc. and derives parameter values using regression or any other suitable statistical algorithm to establish a best fit curve, best fit multi-dimensional surface plot or other appropriate relationship model, which may be discrete or continuous. A supervised learning approach may be used; for example, a neural network, Bayesian classifier, etc. In this way, the relative importance of input factors such as sports fixtures, weather, season, etc. need not be assumed in advance, but can rather be learned and weighted appropriately by the software on the central server 13.

If the software is unable to determine an appropriate relationship, it will alert the operator who can interrogate the data and override with a manual curve or other relationship.

A modeled relationship on the central server 13 may be continuous or discrete over the input variables (flow rate, time, etc.). Although parameters fully describing a continuous, possibly multi-dimensional relationship could be loaded directly onto the control unit 8, in the present embodiment, a simplified lookup table is generated by the central server 13, in which flow, time, etc. are divided into appropriately-sized discrete intervals. This lookup table is loaded onto the control unit 8 and used as described above. The table may be loaded incrementally over time, and may be updated periodically as the central server revises the simplified lookup table to take account of predicted weather patterns for the next 24 hours or week, or future sports fixtures, such as a golf tournament, for example.

The parameters supplied to the control unit 8 from the central facility 13 are such that if there is an interruption in communications for any time, before updated parameters can be loaded, there will be sufficient parameters to adjust the output pressure appropriately over expected periods such as days of the week, weekends and so forth.

The central server 13 may control several independent DMAs, each with its own PRV. Where there are appropriate similarities between the DMAs, the central server 13 preferably uses the data obtained from one DMA to improve the accuracy of the parameters determined for a different DMA. By way of example only, it may be determined from data logged in respect of a first DMA that hours of sunshine has a more significant effect than month of the year in determining the optimal relationship between flow rate M, time T and P2-P3; this knowledge could be used in the optimizing of parameters for a second DMA which may not even be equipped with a light meter. In this way, optimal use is made of the available training data.

The control unit 8 in any particular DMA may have the facility to temporarily override an existing relationship manually—i.e. to toggle between any existing automatically derived or manually set parameters to a new temporary set of parameters, with the ability to revert back to the original.

An optional flow rate monitoring system can be used to trigger an emergency P2 override. An emergency P2 pressure would be programmed to be triggered at a set flow rate. Should the flow rate M exceed the trigger flow rate, the control unit 8 will control the pilot valve 102 to cause the PRV to increase P2 to the emergency value. This function will provide high pressure supply to the DMA in the event of, for example, Fire Hydrant demand during scheduled low pressure periods.

All control methods may feature the following reporting functions: SMS, RS232, IrDA and (optional) wireless outputs; reports detailing all variable values; reports detailing max, min and average P1, P2, (P3 if measured), flow rates (min and Max values are recorded with date/time code); an alarm SMS function to alert for any parameters deviating from alarm set ranges or poor fully automatic curve matching; data-logger dump by RS232, for example.

Logging intervals may be adjustable, for example to 10s, 30s, 1 min, 5 min, 15 min, or an hour. In the present embodiment, the intervals are preferably every 15 minutes.

The control unit 8 may incorporate power saving functions. Thus, the control unit may make adjustments to the PRV only when measured P2 pressure has exceeded a set deviation from the target P2 pressure. The deviation can be adjusted. Increasing the deviation will make the P2 response coarser, but will result in fewer adjustments and hence increased battery life. When running on an optional external power supply, the maximum deviation can be reduced resulting in a finer P2 output characteristic.

Information relating to the pressure in the PRV control space may be used to infer how open or closed the PRV is, and may be used in some embodiments to estimate the PRY outlet pressure based on the inlet pressure P1, control space pressure and flow rate M. The control unit 8 could thereby detect a fault in the P2 outlet pressure sensor and/or operate without a functioning P2 pressure sensor. Similarly, information relating to the control space pressure could be used in some embodiments to estimate the flow rate M through the PRV from information relating to the inlet pressure P1, outlet pressure P2 and control space pressure. The control unit 8 could thereby detect a fault in the flow sensor and/or operate without a functioning flow sensor.

Using battery power, typically the control unit will be set up so that adjustments are made roughly once per hour with more frequent adjustments (perhaps approximately every 15 minutes) during peak change times. An estimate of the typical number of adjustments per day would therefore be between 32 and 36. Further power saving can be achieved by optionally limiting the maximum number of adjustments per 24 hour period. Once the set number of adjustments have been made, the PRV will be set to a default (parameter set) output pressure. This function will be used whenever battery life needs to be in excess of a specified time period.

A chart could be provided to operators to enable them to set the control unit and estimate the associated battery life. A permanent memory function may be available to record the total number of adjustments since new batteries have been fitted.

In general, the control unit is preferably designed with close attention to minimising power consumption, with best practice in design and the latest low power technologies wherever possible.

The control unit may monitor battery life (including the battery life of any external SMS/PSTN or other communications units) and send an alarm (for example through an SMS message) to alert a central control system when battery life is below a set limit.

The control unit 8 includes a full range of local and remote pressure modulating capabilities, combined with several functions which will improve performance, simplify setup and reduce maintenance. The controller is designed and built to be reliable, rugged, versatile and easy to use. The unit is a multi-role controller and data-logger.

An engineer with a laptop computer or PDA may have access to software with the following functions:
Lookup table testing function to model various scenarios;
Setup Data Logger on controller;
Setup Data Logger on remote P3 pressure logger;
Download or read logger data;
Present in graphical and table views;
Establish spot values, min/max etc.;
Calibrate logger/controller;
Set logging rate;
Assign logger ID;
Adjust clock;
Configure all modes, inputs and outputs;
Adjust parameters; and
Setup communication.

As noted above, the control unit may control the PRV 44 using a balance point pilot valve; control is achieved by motor control of the rotational position of a control shaft. However, in an alternative embodiment direct solenoid valve control of the PRV is possible. In such an arrangement the control unit would be connected to two solenoid valves, one of which enables the PRV top chamber to be fed with P1 pressure, the second of which enables the PRV top chamber to reduce to P2. An optional third solenoid valve could enable the top chamber to vent to atmosphere, or optional venturi.

In general, communications between components used in embodiments of the invention can be via wired connections such as a serial (RS232), Universal Serial Bus (USB), Firewire™, LAN or WAN, optical fiber connections and so forth;

by short range wireless communications such as infra red (IrDA), inductive coupling, Bluetooth, Wi-Fi and so forth; or by long range communications using a suitable radio frequency and protocol, a cellular mobile communications network using for example SMS messaging, and so forth. Communication may be direct, over a network such as the Internet, via a central control center and so forth. A component may be configured as a web server to that connection to it and access to data is simplified.

In summary, the preferred embodiments of the invention provide a controller for a pilot valve which adjusts the output pressure of a pressure reducing valve supplying water to a consumer region. With the aim of reducing output pressure whilst still providing a minimum required pressure at a critical point in the region, the controller adjusts the output pressure in accordance with the flow rate. The controller includes a clock and the relationship between the required output pressure and the measured flow rate is time dependent. Parameters which define the relationship are supplied to the controller from a remote data processing system which analyses flow rate and output pressure data transmitted from the controller, and also pressure data from a remote sensor at the critical point. At intervals, the controller establishes a wireless connection with the remote system, to transmit logged data, and to receive parameters covering a period of time which is greater than the interval between communication sessions.

The invention claimed is:

1. An apparatus for adjusting the output pressure of a pressure reducing valve supplying fluid to a consumer region, in order to establish a desired minimum fluid pressure at a critical point in the consumer region, the apparatus comprising:
a controller and
a remote data processing system remote from the controller;
wherein the controller comprises a processor, a data storage unit, a flow rate module which provides data representative of fluid flow rate from the pressure reducing valve into the consumer region, and a first input for a signal representative of said flow rate which is used in determining the required output pressure of the pressure reducing valve; a control output for providing a signal to an adjusting mechanism for adjusting the output pressure of the pressure reducing valve; a second input for receiving, from an output pressure sensor, a signal representative of the output pressure of the pressure reducing valve; a data logging module for logging data representative of the output pressure of the pressure reducing valve at moments in time, together with time stamp information; and a communications module for receiving data from and sending data to the remote data processing system over a wireless communication network;
the data storage unit stores parameters representing a required output pressure from the pressure reducing valve as a function of the flow rate; and the processor is configured to process (i) data representative of the flow rate and (ii) the stored parameters, so that a signal is provided from the control output in order to cause the pressure reducing valve to be adjusted to provide the required output pressure corresponding to the flow rate;

the controller is configured to use the communications module to communicate data logged by the data logging module to the remote data processing system over the wireless communications network at intervals;

the remote data processing system is configured to receive the logged data from the controller at intervals; to receive critical point pressure data from a critical point pressure sensor adjacent the critical point, the critical point pressure data being representative of the pressure at the critical point at moments in time and including time stamp information; to use the logged data received from the controller and the critical point pressure data so as to calculate revised parameters to be transmitted at intervals to the controller, the revised parameters representing a required output pressure from the pressure reducing valve as a revised function of the flow rate; and to transmit the revised parameters to the controller over the wireless communications network at intervals; and the controller is configured to use the communications module to receive the revised parameters from the remote data processing system at intervals over the wireless communications network; to store the revised parameters in the data storage unit; and to use the revised parameters to provide a signal from the control output in order to cause the pressure reducing valve to be adjusted.

2. An apparatus as claimed in claim 1, wherein the controller includes a clock, the stored parameters represent a relationship between the required output pressure from the pressure reducing valve and both flow rate and time, and the controller is configured so that the signal provided from the control output causes the pressure reducing valve to be adjusted to provide the required output pressure corresponding to both the flow rate and the time.

3. An apparatus as claimed in claim 1, wherein the remote data processing system is configured so that the revised parameters transmitted to the controller at a point in time, are valid for a period of time which is greater than the interval between that point in time and the next point in time when revised parameters are to be transmitted to the controller.

4. An apparatus as claimed in claim 1, wherein the parameters take into account at least one environmental factor.

5. An apparatus as claimed in claim 4, wherein the environmental factor is based on predicted weather conditions; fluid use restrictions; or predicted variations in normal consumer fluid usage patterns.

6. An apparatus as claimed in claim 1, wherein the parameters are used in a function processed by the processor of the controller.

7. An apparatus as claimed in claim 1, wherein the pressure reducing valve is controlled by a pilot valve, and the pilot valve is arranged to receive control signals from the control output of the controller.

8. An apparatus as claimed in claim 7, wherein a backup pilot valve is provided and is arranged to be activated in the event of failure of the pilot valve or the controller.

9. A controller for adjusting the output pressure of a pressure reducing valve supplying fluid to a consumer region, in order to establish a desired minimum fluid pressure at a critical point in the consumer region, the controller comprising:

a processor;
a data storage unit;
a first input for a signal representative of a flow rate from the pressure reducing valve into the consumer region, which is used in determining the required output pressure of the pressure reducing valve;
a control output for providing a signal to an adjusting mechanism for adjusting the output pressure of the pressure reducing valve;
a second input for receiving, from an output pressure sensor, a signal representative of the output pressure of the pressure reducing valve;
a data logging module for logging data representative of the output pressure of the pressure reducing valve at moments in time, together with time stamp information; and
a communications module for receiving data from and sending data to a data processing system remote from the controller, over a wireless communications network;
wherein the data storage unit stores parameters representing a required output pressure from the pressure reducing valve as a function of the flow rate; and the processor is configured to process (i) data representative of the flow rate and (ii) the stored parameters, so that a signal is provided from the control output in order to cause the pressure reducing valve to be adjusted to provide the required output pressure corresponding to the flow rate; and
the controller is configured to communicate logged data at intervals to the remote data processing system over the wireless communications network; to receive revised parameters from the remote data processing system at intervals, the revised parameters representing a required output pressure from the pressure reducing valve as a revised function of the flow rate; to store the revised parameters in the data storage unit; and to use the revised parameters to provide a signal from the control output in order to cause the pressure reducing valve to be adjusted.

10. A method of adjusting the output pressure of a pressure reducing valve supplying fluid to a consumer region, in order to establish a desired minimum fluid pressure at a critical point in the consumer region, using a controller which comprises a processor, a data storage unit, a first input for a signal which is used to provide data representative of the flow rate from the pressure reducing valve; a control output for providing a signal to an adjusting mechanism to adjust the output pressure of the pressure reducing valve; a second input which receives, from an output pressure sensor, a signal representative of the output pressure of the pressure reducing valve; and a data logging module which logs data representative of the output pressure of the pressure reducing valve at moments in time, together with time stamp information, comprising:

the data storage unit storing a first set of parameters representing a required output pressure from the pressure reducing valve as a function of the flow rate, the first set of parameters being applicable for a first period of time;

the processor processing (i) the data representative of the flow rate and (ii) the stored set of parameters, so that a signal is provided from the control output which causes the pressure reducing valve to be adjusted to provide the required output pressure corresponding to the flow rate;

storing critical point pressure data from a critical point pressure sensor adjacent the critical point, the critical point pressure data being representative of the pressure at the critical point at moments in time and including time stamp information; and calculating, at intervals, revised sets of parameters using the logged data representative of the output pressure from the pressure reducing valve, and the stored critical point pressure data, and storing each revised set of parameters in the data storage module, each revised set of parameters representing a required output pressure from the pressure reducing valve as a function of the flow rate and being applicable for a subsequent period of time.

11. A method as claimed in claim 10, wherein a remote data system receives and stores the critical point pressure data from the critical pressure sensor, and calculates the revised sets of parameters; and the controller has a communications module which is used (i) to communicate to the remote data processing system at intervals the logged data representative of the output pressure from the pressure reducing valve; and (ii) to receive the revised sets of parameters from the remote data processing system.

12. A method as claimed in claim 10, wherein the controller receives and stores the critical point pressure data from the critical point pressure sensor and calculates the revised sets of parameters.

13. A method as claimed in claim 10, wherein each set of parameters is applicable for a period of time which is greater than the interval until the next set of parameters.

14. A method as claimed in claim 10, wherein the controller includes a clock and the stored set of parameters represents a relationship between the required output pressure from the pressure reducing valve and both flow rate and time, and the signal provided from the control output causes the pressure reducing valve to be adjusted to provide the required output pressure corresponding to both the flow rate and the time in order to establish the desired minimum fluid pressure at the critical point in the consumer region.

15. A method as claimed in claim 10, wherein the parameters take into account at least one environmental factor.

16. A method as claimed in claim 15, wherein the environmental factor is based on predicted weather conditions; fluid use restrictions; or predicted variations in normal consumer fluid usage patterns.

17. A method as claimed in claim 10, wherein the pressure reducing valve is controlled by a pilot valve, and the pilot valve is arranged to receive control signals from the control output of the controller.

18. A method as claimed in claim 10, wherein the fluid is water.

* * * * *